United States Patent [19]
Ashton

[11] 3,865,412
[45] Feb. 11, 1975

[54] COUPLER

[75] Inventor: Albert A. Ashton, Dallas, Tex.

[73] Assignee: Youngstown Sheet and Tube Company, Youngstown, Ohio

[22] Filed: Jan. 11, 1973

[21] Appl. No.: 322,776

[52] U.S. Cl.............. 285/364, 285/24, 285/177, 285/420, 403/336
[51] Int. Cl............................................. F16l 19/02
[58] Field of Search .......... 285/177, 420, 368, 364, 285/349, 24, 27, 39, 320, 412, 363, 365, 366, 367, 405; 403/338, 336, 335

[56] References Cited
UNITED STATES PATENTS

| 2,919,936 | 1/1960 | Hurley | 285/368 X |
| 3,524,662 | 8/1970 | Tolman et al. | 285/368 |
| 3,586,350 | 6/1971 | Ashton | 285/24 |
| 3,702,199 | 11/1972 | Brooks et al. | 285/368 X |

FOREIGN PATENTS OR APPLICATIONS 207,296  3/1957  Australia.............................. 285/177

Primary Examiner—Jordon Franklin
Assistant Examiner—Moshe I. Cohen

[57] ABSTRACT

A coupler for coupling two conduits together such as a loading arm and a ship's manifold in which jaw assemblies reach around a ship's pipe flange to engage the flange and draw the coupler into sealing engagement therewith. Provisions are made for coupling to ship's manifolds of varying sizes by the use of an adapter flange which bridges between the coupler and ship's flange.

4 Claims, 4 Drawing Figures

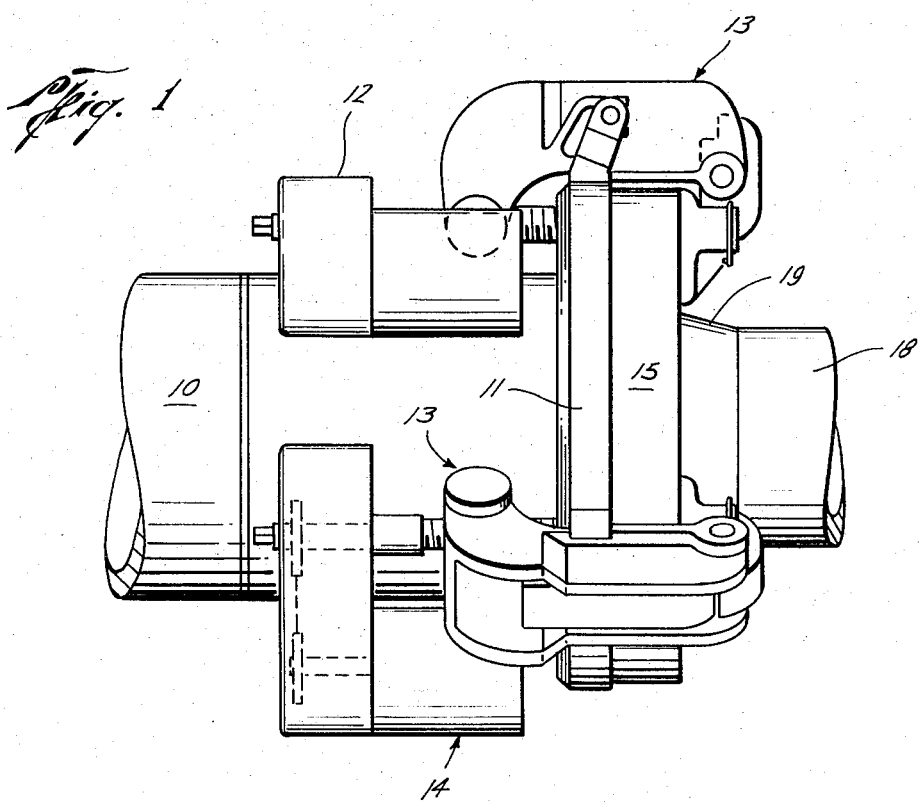
Fig. 1
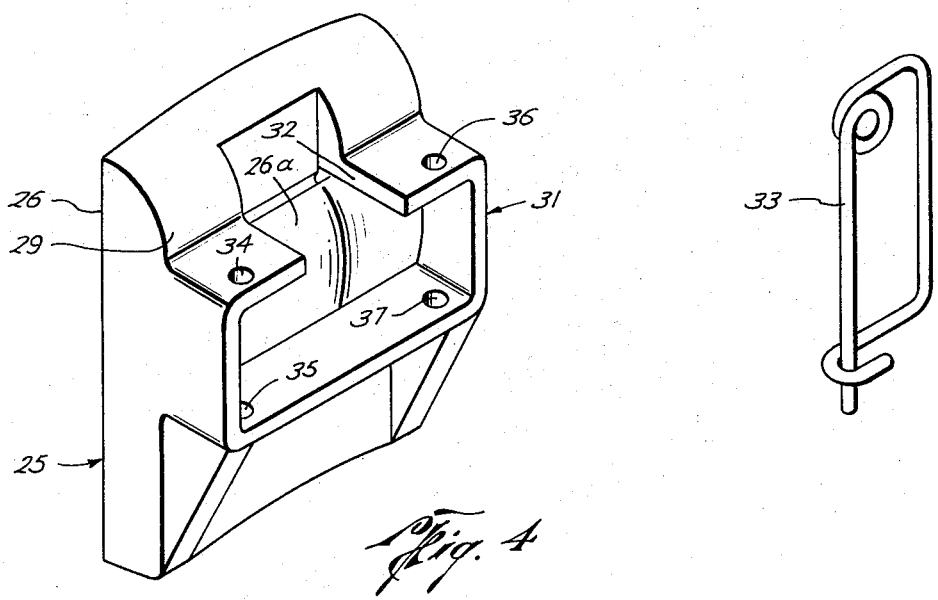
Fig. 3
Fig. 4

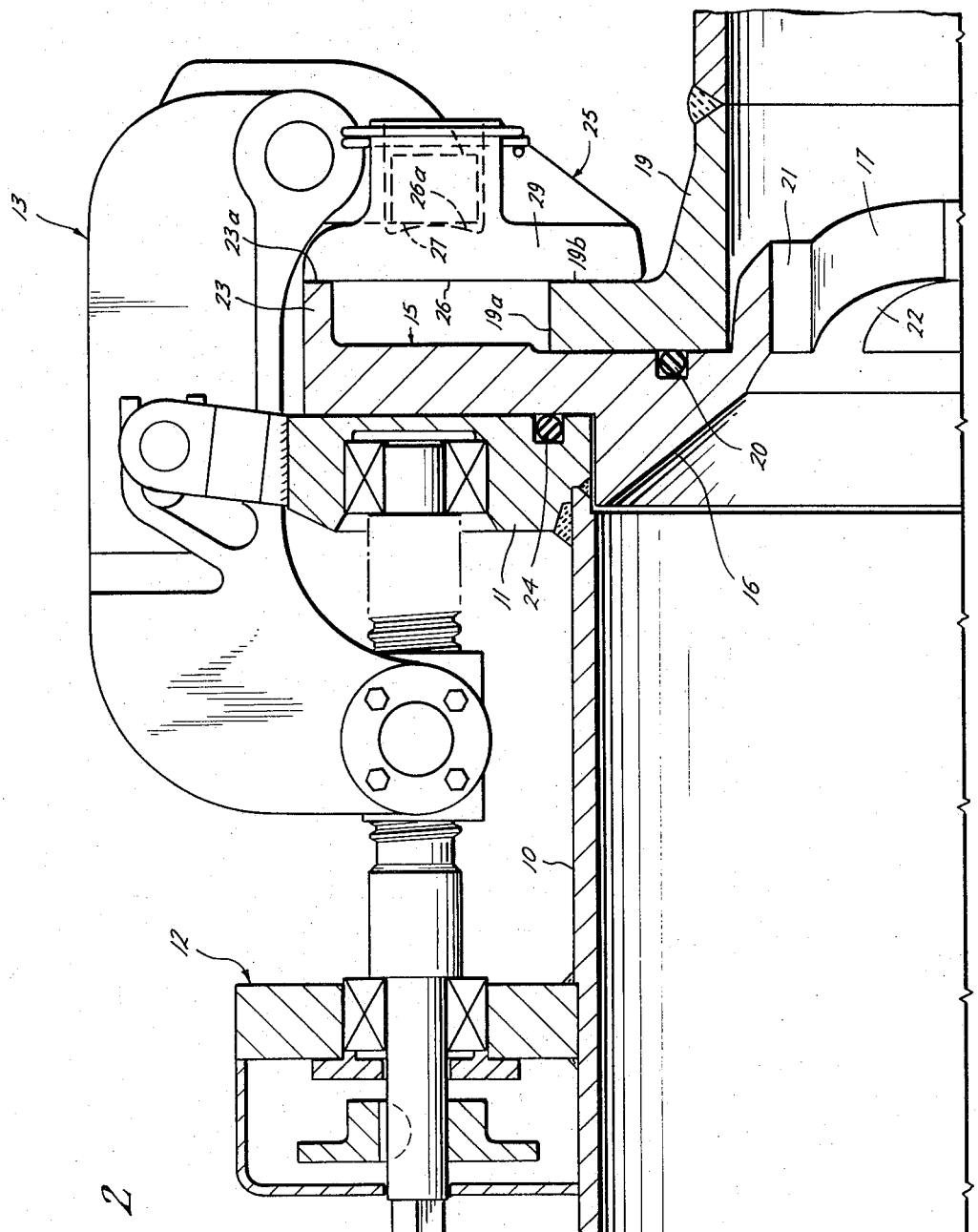

COUPLER

This invention relates to couplers and more particularly to couplers for coupling two conduits together of different sizes of the type in which jaw assemblies reach around a flange on a smaller conduit and draw the two conduits into sealing engagement with each other.

Couplers of the type utilizing jaws to draw two conduits together are well known as shown in U.S. Pat. No. 3,586,350 issued to Albert A. Ashton, June 22, 1971. Reference is made to this patent for a complete disclosure of all the details of the coupler mechanism and its manner of operation.

It is an object of this invention to utilize a coupler assembly such as shown in U.S. Pat. No. 3,586,350 to couple together a conduit with other conduits of differing sizes without increasing the bending moments on the jaws utilized to couple the two conduits together.

Another object is to provide a coupler apparatus such as shown in U.S. Pat. No. 3,586,350 in which the coupler may be utilized to couple together a conduit with other conduits of equal or varying smaller sizes in which the bending moments on the coupler jaws are the same for all such sizes of conduits.

Other objects, features and advantages will be apparent from the drawings, the specification and the claims. In the drawings wherein an illustrative embodiment of this invention is shown and wherein like reference numerals indicate like parts.

FIG. 1 is a view in side elevation of a coupler constructed in accordance with this invention shown coupling two conduits together;

FIG. 2 is a quarter sectional view with the clamp arm and jaw adapter shown in elevation taken along a line passing through one of the coupler jaws of the coupler of FIG. 1;

FIG. 3 is an elevational view of a pin for pinning a jaw adapter to a jaw; and

FIG. 4 is an isometric view of one of the jaw adapters.

The coupler of this invention is preferably made integral with the outlet conduit 10 of a loading arm. The coupler includes a flange 11 secured to the outlet end of the conduit 10 which together with the housing 12 supports the clamp jaws. These clamp jaws are indicated generally at 13. They are operated by the prime movers indicated generally at 14 in the manner explained in the above identified U.S. Pat. No. 3,586,350.

The jaws 13 expand and extend when releasing a conduit and move radially inwardly and contract when drawing two conduits together.

A flange adapter indicated generally at 15 is provided to permit the coupler to be operable with other conduits or ship's flanges of varying smaller size. The flange adapter 15 has a boss 16 which extends into conduit 10 to align it therewith. The adapter also has a flow way 17 extending therethrough to provide for communication between the conduit 10 and the conduit 18. The conduit 18 will have at its inlet end the flange 19 which receives the guide section 21 of the flange adapter 15. A plurality of strengthening ribs 22 extend across the flow way 17 through the flange adapter.

Suitable seal means are provided to give a fluid tight seal between the flange 11 of the coupler member and the ship's flange 19. These seals may be provided by any desired means such as the O-rings 20 and 24.

At its outer periphery the flange adapter is provided with an axially extending flange 23 for engagement with the jaw adapter to be referred to hereinafter. It will be noted that the axially extending flange 23 is of greater diameter than the outer periphery 19a of the ship's flange 19. The configuration of the flange adapter 15 preferably is such that when it is in engagement with the ship's flange 19 the contact surface 23a of the axially extending flange 23 is substantially in line with the back surface 19b of the ship's flange 19.

In order to hold the coupler in firm sealing contact with the flange adapter 15 and the ship's flange 19 each jaw is provided with a jaw adapter indicated generally at 25. The jaw adapter preferably has a substantially flat contacting surface 26 and is of sufficient radial dimension to contact the surface 23a on the flange adapter 15 and the surface 19b on the back side of the ship's flange 19. The jaw adapter has a contacting surface 26a which engages the face 27 of the jaw. Preferably the surface 26a is slightly arced to provide a general line contact between the jaw and jaw adapter. This surface may be slightly cylindrical about a central axis tangential to a circle drawn about the central axis of the ship's flange 19 or it may be convex. The jaw adapter may thus rock relative to the jaw so that no side forces or stresses are induced when the coupler draws the several flanges 11, 15 and 19 together.

It will be appreciated that where a ship's manifold conduit is of equal diameter with the loading arm conduit 10 that no jaw adapter need be employed and the jaw 13 will bear directly against the ship's flange. In order to take up the space between the ship's flange and flange 11 however, a flange adapter will be interspersed between the two flanges. This flange will act as a spacer to permit the same coupler to be used and will guide and maintain conduit 18 in axial alignment with conduit 10. Such a flange will follow the general configuration of that shown in FIG. 2 except that it will not provide for a reduced diameter in its bore and there will be no necessity for the axially extending flange 23.

By reference to FIG. 4 it will be seen that the jaw adapter is preferably a generally flat bridging member 29 which has the surface 26 for contacting the surfaces 19b and 23a on the ship's flange and flange adapter. In order to loosely connect the jaw adapter with the jaw an open box structure indicated generally at 31 is provided on the side of the jaw adapter adjacent to the jaw. This box has a slot 32 in one side to permit passage of the jaw therethrough. The contacting face 27 of the jaw is generally rectangular configuration and is received within the box 31. Suitable pins of any desired configuration such as those shown at 33 in FIG. 3 may be passed through the series of holes 34, 35, 36 and 37 to loosely mount the jaw adapter on the jaw. Two of these pins 33 are preferably employed as this will hold the jaw adapter in proper orientation on the jaw. These pins permit easy exchange of jaw adapters to accomodate ship's flanges of different sizes.

As the ship's flange 19 decreases in diameter the flat contacting or bridging member 29 of the jaw adapter used will be extended so that it will bridge the space between the ship's flange and the flange adapter 15.

It will be appreciated that the construction explained is in effect a lever with pressure applied at face 27 and exerted at the two ends of the lever where they contact with the contact surfaces 23a and 19b. As the jaw adapter is loosely mounted and has in effect a line contact with the jaw no additional stresses are induced in the system no matter what the diameter of the ship's flange. There is no increased bending moment induced in the clamping jaws 13 due to decrease in diameter of the ship's flange 19. It will be appreciated that if the jaw 13 merely had a member extending radially inwardly toward the center of the ship's flange a distance sufficient to engage the ship's flange that the bending moment on the clamping jaw would increase as the diameter of the ship's flange decreased. By providing the structure illustrated herein the design may be of minimum weight, as it need not be designed for the large bending moment which would be present if the clamping jaws contacted directly with the ship's flange and did not distribute the contact between the ships's flange and the flange adapter. This is of extreme importance where the coupler member is carried on the outboard end of a large loading arm and every excess pound of weight on the outboard end of the arm is reflected in the design of the entire arm back to its base.

It will be appreciated that by having the jaw adapter contact the flange adapter and the ship's flange that all the force exerted by the clamping jaw is applied in a substantially horizontal direction so that there is no radially outward component tending to cause the jaw to slip off the ship's flange. The force is always applied at the point of contact of jaw face 27 and adapter surface 26a regardless of the diameter of the ship's flange.

The forces exerted against the ship's flange must also be sufficient to prevent the flange adapter from separating from the ship's flange under pressure. While a decrease in size in the ship's flange results in a larger moment arm between the ship's flange and the point of contact of the clamping jaw with the jaw adapter this increasing moment arm is compensated for by the reduced forces tending to separate the flange adapter and ship's flange due to the reduced diameter of the ship's flange.

From the above it will be seen that by utilizing a flange adapter and using a bridging member between the ship's flange and the outer periphery of the flange adapter with such member engaged by the clamping jaw at a point between such two points of engagement that the bending moment on the adapter jaws may be held to a constant minimum while permitting a single coupler to be used with ship's flanges of varying smaller sizes.

The foregoing disclosure and description of the invention are illustrative and explanatory thereof and various changes in the size, shape and materials, as well as in the details of the illustrated construction, may be made within the scope of the appended claims without departing from the spirit of the invention.

What is claimed is:

1. A coupler comprising;

first and second conduits each having flanged ends;

coupler means carried by the first conduit and having a plurality of jaws movable in two directions in a single plane for selectively clamping the first and second conduits together;

a flange adapter positioned between and in engagement with the two conduit flanges;

said adapter having an external flange of greater radial dimension than that of the second conduit flange and spaced therefrom to provide an annular space between the adapter's external flange and the second conduit flange;

said adapter having a flowway for conducting fluids between the two conduits;

means for sealing between the flange adapter and each of the first and second conduits;

jaw adapters carried by the jaws and in engagement with the external flange of the flange adapter and with the flange of the second conduit thereby overlying said annular space;

said jaws engaging and applying force to each jaw adapter at a point between the points of engagement of the jaw adapter with the flange adapter and the second conduit flange.

2. The coupler of claim 1 wherein the jaw adapters are loosely carried by the movable jaws.

3. The coupler of claim 1 wherein the contact surface of one of said jaws and jaw adapters is cylindrical to provide a rocking contact therebetween.

4. A coupler comprising;

a first conduit having a flange thereon;

coupler means carried by the first conduit and having a plurality of jaws arranged about the conduit and movable in two directions in a single plane toward and away from said flange;

means for moving said jaw in said two directions;

a jaw adapter carried by each jaw having a contacting face for contacting said jaw and extending radially of the longitudinal axis of the first conduit to either side of the contacting face;

said jaw adapter portion radially inboard of the jaw dimensioned to engage a second conduit flange which is to be coupled to the first conduit flange;

a flange adapter having a flowway therethrough;

said flange adapter having a surface on one side engaged with the first conduit flange and inner and outer circumferentially spaced surfaces on the other side;

said outer circumferentially spaced surface engagable with the jaw adapter radially outboard of said contacting face, and said inner circumferentially spaced surface positioned radially inboard of said jaw adapter contacting face and engagable with the flange of a conduit to be secured to the first conduit;

and means for sealing between the flange adapter and first conduit and the flange of a conduit to be secured to the first conduit.

* * * * *